(12) United States Patent
Oba

(10) Patent No.: US 8,456,672 B2
(45) Date of Patent: Jun. 4, 2013

(54) DOCUMENT SUBMISSION MANAGEMENT SYSTEM AND METHOD FOR THE SAME

(75) Inventor: Yoshitaka Oba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 12/542,853

(22) Filed: Aug. 18, 2009

(65) Prior Publication Data

US 2010/0053673 A1 Mar. 4, 2010

(30) Foreign Application Priority Data

Sep. 1, 2008 (JP) ................................ 2008-223412

(51) Int. Cl.
*G07B 17/00* (2006.01)
*G06F 3/12* (2006.01)

(52) U.S. Cl.
USPC .......... 358/1.15; 358/1.18; 358/1.13; 705/28; 705/29; 705/30; 705/400; 399/24; 399/79

(58) Field of Classification Search
USPC ............ 358/1.15–1.18; 399/24, 79; 705/26.8, 705/28, 29, 30, 400
See application file for complete search history.

(56) References Cited

U.S. PATENT DOCUMENTS

| 5,383,129 | A | * | 1/1995 | Farrell | 705/400 |
| 5,850,584 | A | * | 12/1998 | Robinson et al. | 399/79 |
| 6,025,925 | A | * | 2/2000 | Davidson et al. | 358/1.15 |
| 6,076,080 | A | * | 6/2000 | Morscheck et al. | 705/400 |
| 6,330,542 | B1 | * | 12/2001 | Sevcik et al. | 705/7.26 |
| 6,801,731 | B2 | * | 10/2004 | Parker | 399/79 |
| 7,257,343 | B2 | * | 8/2007 | Inoue et al. | 399/82 |
| 7,743,000 | B2 | * | 6/2010 | Allen et al. | 705/400 |
| 7,802,932 | B2 | * | 9/2010 | Mima | 400/76 |
| 2002/0184120 | A1 | * | 12/2002 | Suzuki et al. | 705/30 |
| 2003/0084006 | A1 | * | 5/2003 | Hobbs | 705/400 |
| 2005/0185979 | A1 | * | 8/2005 | Inoue et al. | 399/82 |
| 2007/0189784 | A1 | | 8/2007 | Ujigawa | |
| 2009/0190148 | A1 | * | 7/2009 | Yabe | 358/1.9 |

FOREIGN PATENT DOCUMENTS

| JP | 2000-307783 A | 11/2000 |
| JP | 2004-303230 A | 10/2004 |
| JP | 2006-281497 A | 10/2006 |
| JP | 2007-213471 A | 8/2007 |
| JP | 2008-152545 A | 7/2008 |

* cited by examiner

*Primary Examiner* — Dennis Dicker

(74) *Attorney, Agent, or Firm* — Canon USA, Inc., I.P. Division

(57) ABSTRACT

A document submission management system calculates predicted values of the amount of consumption of consumables used for printing processing according to an order from a user, estimates the cost of the printing processing based on the predicted values, and transmits the estimated cost to a client terminal of the user. A user interface allowing placement of an order briefly displays the cost for a print option. For the cost estimate, the cost of printing form data used in printing processing is registered in advance in a memory in the document submission management system, so that time required for the calculation of the estimate is reduced.

4 Claims, 17 Drawing Sheets

FIG. 8

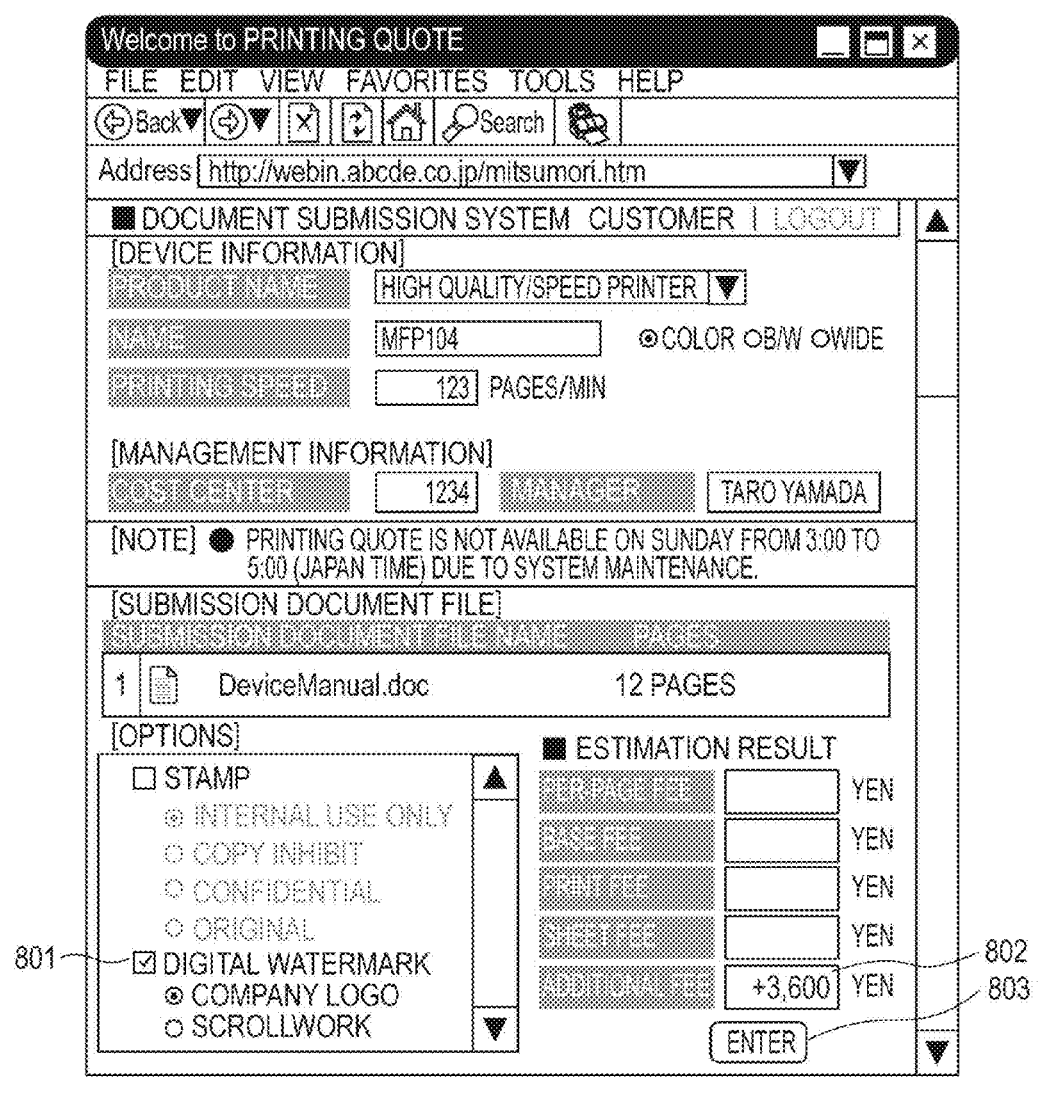

Welcome to PRINTING QUOTE
FILE  EDIT  VIEW  FAVORITES  TOOLS  HELP
Back  Search
Address http://webin.abcde.co.jp/mitsumori.htm ■ DOCUMENT SUBMISSION SYSTEM  CUSTOMER | LOGOUT
[DEVICE INFORMATION]
PRODUCT TYPE  HIGH QUALITY/SPEED PRINTER ▼
NAME  MFP104  ⦿ COLOR ○ B/W ○ WIDE
PRINTING SPEED  123 PAGES/MIN

[MANAGEMENT INFORMATION]
COST CENTER  1234  MANAGER  TARO YAMADA

[NOTE] ● PRINTING QUOTE IS NOT AVAILABLE ON SUNDAY FROM 3:00 TO 5:00 (JAPAN TIME) DUE TO SYSTEM MAINTENANCE.

[SUBMISSION DOCUMENT FILE]
1  DeviceManual.doc  12 PAGES

[OPTIONS]                    ■ ESTIMATION RESULT
☐ STAMP                                         YEN
  ○ INTERNAL USE ONLY                           YEN
  ○ COPY INHIBIT                                YEN
  ○ CONFIDENTIAL                                YEN
  ○ ORIGINAL
801 — ☑ DIGITAL WATERMARK                      +3,600 YEN — 802
      ⦿ COMPANY LOGO                                       — 803
      ○ SCROLLWORK                  ENTER

FIG. 9

Welcome to PRINTING QUOTE

FILE  EDIT  VIEW  FAVORITES  TOOLS  HELP

Back  Search

Address http://webin.abcde.co.jp/mitsumori.htm

■ DOCUMENT SUBMISSION SYSTEM  CUSTOMER | LOGOUT

[DEVICE INFORMATION]

HIGH QUALITY/SPEED PRINTER

MFP104    ⊙COLOR ○B/W ○WIDE

123 PAGES/MIN

[MANAGEMENT INFORMATION]

1234    TARO YAMADA

[NOTE] ● PRINTING QUOTE IS NOT AVAILABLE ON SUNDAY FROM 3:00 TO 5:00 (JAPAN TIME) DUE TO SYSTEM MAINTENANCE.

[SUBMISSION DOCUMENT FILE]

1  DeviceManual.doc    12 PAGES

[OPTIONS]

901 — ☑ DIGITAL WATERMARK
         ⊙ COMPANY LOGO
903 — ☑ ADDITIONAL OPTIONS
         ⊙ PAGES NUMBER
         ⊙ DATE

■ ESTIMATION RESULT — 902

2,400 YEN
840 YEN
47,220 YEN
720 YEN
5,600 YEN — 904

[START PRINTING]  [CORRECT]  [TOTAL]  56,790 YEN 905    906

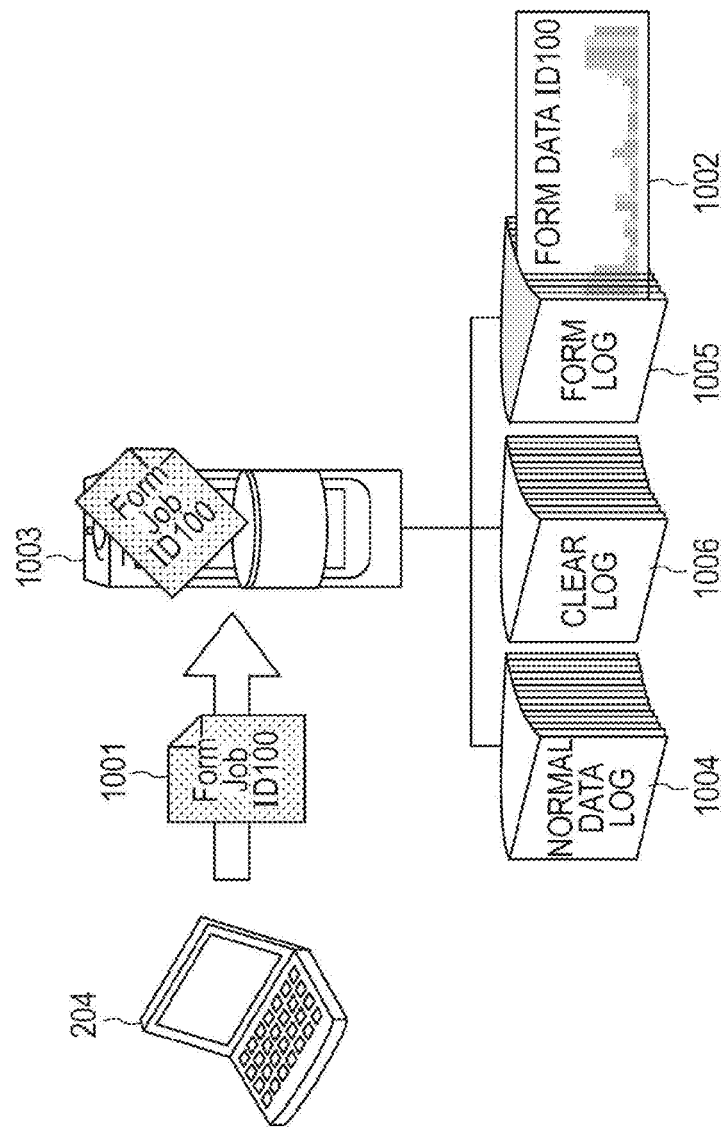

DOCUMENT SUBMISSION MANAGEMENT SYSTEM AND METHOD FOR THE SAME

BACKGROUND OF THE INVENTION

1. Field of the Invention

The present invention relates to systems for estimating costs for printing of submitted print data and the like.

2. Description of the Related Art

In the commercial printing industry, in general, companies earn profits by receiving production orders from third parties (clients) for printed materials such as magazines, newspapers, catalogs, advertisements, and photo collections, producing printed materials requested by the clients, and then delivering the printed materials to the clients. Nowadays, large-scale printing machines such as offset presses are generally used in the industry.

In the commercial printing industry, various manufacturing processes are involved in printing procedures, such as document submission, design, layout, comprehensive layout (presentation of printer outputs), proofreading (layout correction and color collection), proof-printing, plate making, printing, postpress, and delivering. This is because once a printing plate is made, which is essential for using such a print press as mentioned above, it is difficult and expensive to make a correction on the printing plate, and thus elaborate proofing processes are necessary.

Thus, in the commercial printing industry, large-scale machines are necessary and it takes a long time to produce printed materials requested by clients.

On the other hand, there have been advances in the speed and quality of electrophotographic printing apparatuses and inkjet printing apparatuses. Along with these advances, the market for print-on-demand (POD) that uses image forming devices such as digital copying machines and digital multifunction machines has also been growing.

POD is aimed at handling relatively small-lot print jobs compared with general print runs in the traditional commercial printing industry without using large systems in short delivery periods. Thus POD makes good use of image forming devices instead of large-scale systems to realize digital printing of electronic data using Web services or the like which meet requests from clients.

In addition, in the POD industry, digitalized management and control of manufacturing processes and costs have been widespread. Under such a trend, there are several forms of service delivery such as PFP (print-for-pay) for print shops and CRD (centralized reproduction department), which is an in-house printing service for companies.

The traditional printing industry and POD industry also provide management services in which all business transactions are comprehensively carried out, including ordering of products (printed materials), packing, delivery, follow-up services, inventory control, and payment management.

In systems for providing such management services, methods of cost management are important to inform clients of the cost of producing requested printed materials. For example, Japanese Patent Laid-Open No. 2007-213471 discloses an apparatus and a method for performing a simulation of processing to be performed by an image forming device. In this apparatus, in order to estimate the amount of consumption of a consumable in actual use by performing simulation, an image formation command including information of a target image to be formed is acquired and the amount of consumption of the consumable is calculated from the acquired image.

However, the disclosed technique does not aim to clearly inform users of an estimate of the cost of whole printing processing, available print settings, and the costs of the settings before the users place print orders.

Supposing a case in which a user is allowed to place an order with an option in which printing is to be performed using information such as form information which has been registered beforehand in an image forming device, when the cost for such an order of form overlay printing is estimated by simulation, a device for performing simulation may read form data every time an estimate is requested and calculate the amounts of consumption of consumables used for a form-overlaid document. Such a simulation process takes a very long time to obtain an estimation result. Since it is likely that a user places an order while taking into account an estimation result, time-consuming simulation would result in a long time before the user actually places the order. This would significantly degrade the usability of a Web service.

SUMMARY OF THE INVENTION

The present invention has been made in view of the above circumstances. Accordingly, there is a need for a technique in a printing system which performs printing processing upon reception of an order from a user, for providing users with information regarding an estimate of the cost of whole printing processing, available print settings, the costs of the settings, and the like.

There is also a need for a technique in a printing system which performs printing processing upon reception of an order from a user, for immediately providing the user with a result of estimation based on predicted values of the amounts of consumption of consumables used for the printing processing.

A document submission management system according to an embodiment of the present invention manages processing related to printing processing according to an order from a user through a client terminal. The document submission management system includes an acquiring unit configured to acquire information on a print option to be provided by an image forming device performing the printing processing according to the order from the user through the client terminal, a user interface providing unit configured to provide information for providing the client terminal with a user interface screen for setting print data used in the printing processing and the print option based on the information acquired by the acquiring unit, a calculating unit configured to calculate a predicted value of the amount of consumption of a consumable used for the printing processing, on the basis of print data and the print option set by the user through the UI screen, an estimating unit configured to estimate the cost for the printing processing according to the order from the user as an estimated value based on the predicted value calculated by the calculating unit, and a transmitting unit configured to transmit the estimated value obtained by the estimating unit to the client terminal. In the document submission management system, when a designation of a print option is received from the user through the user interface screen provided in the client terminal, the user interface providing unit provides information for displaying a print cost caused by the print option on the user interface screen.

A document submission management system according to an embodiment of the present invention manages processing related to printing processing according to an order from a user through a client terminal. The document submission management system includes a calculating unit configured to calculate, from image data, a predicted value of the amount of consumption of a consumable used for printing the image data, a registering unit configured to calculate, using the calculating unit, a predicted value of the amount of consumption of a consumable used for printing form data available for the order from the user and registers the calculated predicted value and an ID for identifying the form data in the memory as log data, a user interface providing unit configured to provide information for providing the client terminal with a user interface screen for performing setting regarding the order from the user, an estimating unit configured to, when an order for printing processing using the form data is placed by the user through the user interface screen provided by the user interface providing unit, estimate the cost for the printing processing according to the order from the user based on the predicted value as an estimated value, by utilizing the log data registered by the registering unit, without calculating, using the calculating unit, the predicted value of the amount of consumption of a consumable used for printing the form data selected by the user, and a transmitting unit configured to transmit the estimated value obtained by the estimating unit to the client terminal.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 illustrates input of options displayed on a user interface provided by the document submission management system according to an exemplary embodiment of the present invention.

FIG. 9 illustrates display of an estimated value on a user interface provided by the document submission management system according to an exemplary embodiment of the present invention.

FIG. 10 schematically illustrates calculation processing of a predicted value of the amount of consumption of a consumable in the document submission management system according to an exemplary embodiment of the present invention.

DESCRIPTION OF THE EMBODIMENTS

In the following, preferred exemplary embodiments of the present invention will be described with reference to the accompanying drawings.

First Exemplary Embodiment

[System Configuration]

Figure 1:
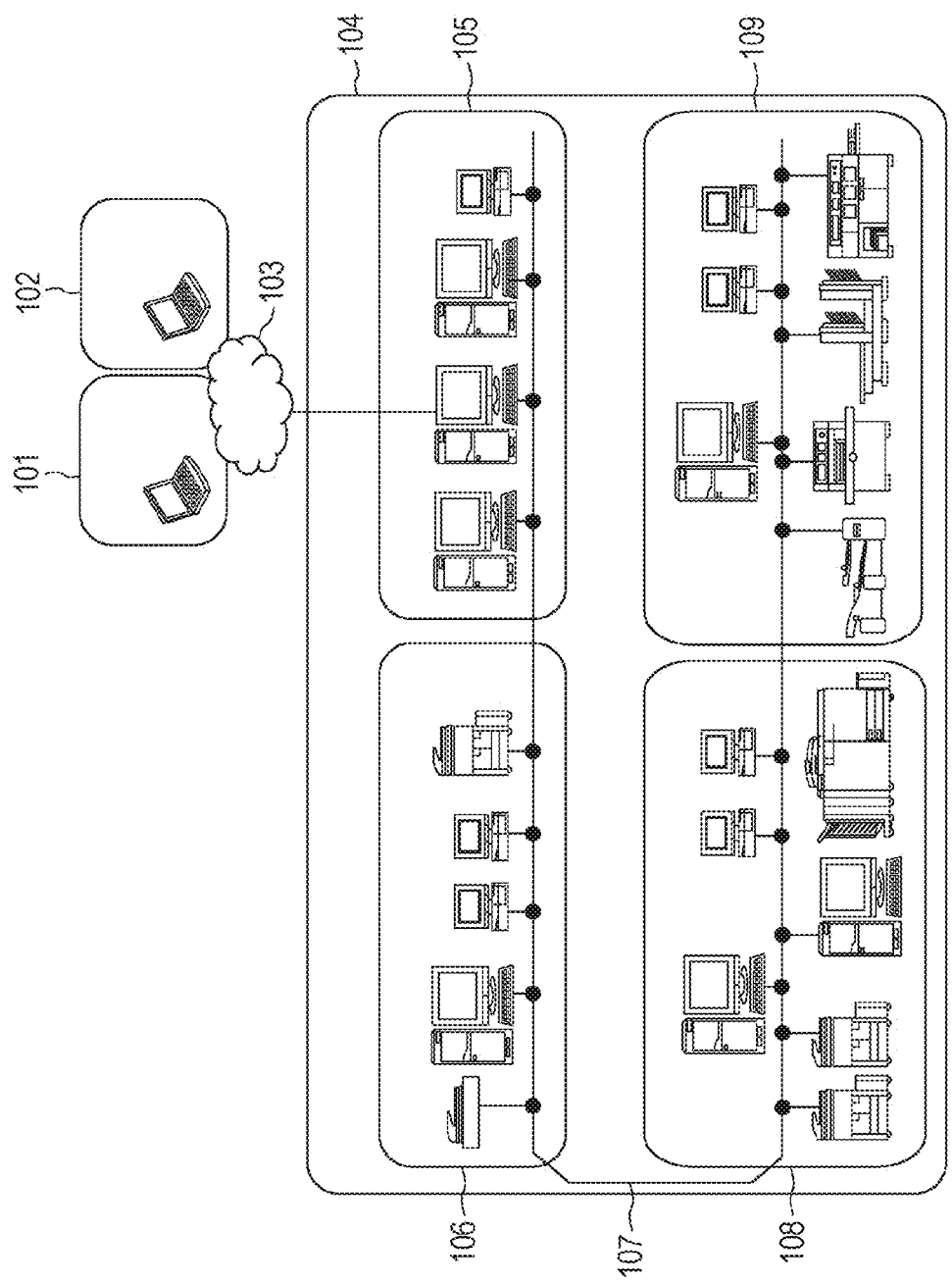
FIG. 1 illustrates an entire system according to an exemplary embodiment of the present invention.

FIG. 1 illustrates an example of a basic configuration of an entire system according to an exemplary embodiment of the present invention. The system includes at least one end-user environment (end-user environments 101 and 102 in this example) and a POD (print-on-demand) site environment 104 which are connected over the Internet 103.

Each of the end-user environments 101 and 102 includes an end user who is to place an order for printing. The end user can place an order for printing and check the status of a print job, the print fee, and the like, from the corresponding end-user environment using a client PC (client terminal).

The POD site environment 104 includes a process management system 105, a prepress system 106, a digital printing system 108, and a postpress system 109. The systems realize printing processes such as prepress, printing, and postpress and are interconnected via a network 107.

The process management system 105 controls and manages processes to be performed by the individual systems in the POD site environment 104. The process management system 105 also receives and manages a print order from the end user, and calculates and manages the print cost. Moreover, the process management system 105 constructs tasks in the processes in the form of a workflow according to specifications from the end user and efficiently schedules the tasks in devices and operators.

The prepress system 106 scans an original document received from the end user using a scanning device such as a scanner and an MFP (multifunction peripheral) on the basis of an instruction regarding a prepress job received from the process management system 105. The prepress system 106 then loads the scanned document as a scanned image file in a prepress server or a PC. At the same time, the prepress system 106 performs image correction, file merging, page insertion/deletion, page layout editing, and imposition. The prepress system 106 also outputs a proof sheet to check the layout and color of a final product according to need.

The digital printing system 108 performs printing using an MFP in accordance with an instruction regarding a print job received from the process management system 105 or the prepress system 106. The digital printing system 108 also performs printing of an image file received from a PC via a printer driver or a hot folder and a document/image file created by editing the image file, using the MFP or the like.

The postpress system 109 performs postpress processing in accordance with an instruction regarding a postpress job transmitted from the process management system 105, the prepress system 106, or the digital printing system 108. In this exemplary embodiment, at least any one of a folding machine, a saddle stitching machine, a case binding machine, a trimming machine, an inserting machine, or a collating machine is used as a postpress device. Thus, the postpress system 109 performs finishing processing on the printed material output from the digital printing system 108, such as paper folding, saddle stitching, case biding, trimming, insertion, and collation.

Note that information processors included in the entire system, such as a server and a client PC each have basic hardware components such as a CPU (central processing unit), a HD (hard disk), a RAM (random access memory), a ROM (read-only memory), a network control device, a display device (display unit), and an input/output device. Processing to be performed according to this exemplary embodiment is realized by storing a predetermined program in a storage medium provided in each of the information processors and executing the program by the CPU.

[Configuration of Process Management System]

Figure 2:
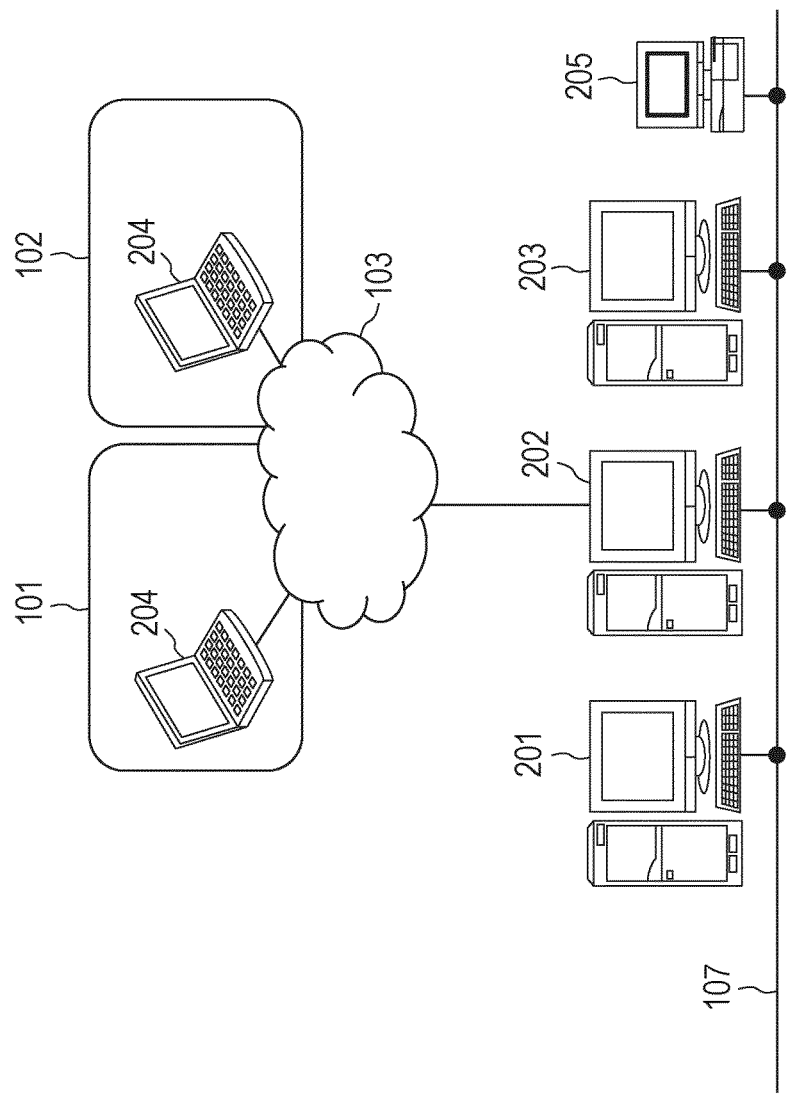
FIG. 2 illustrates a configuration of a process management system according to an exemplary embodiment of the present invention.

FIG. 2 illustrates an example of a configuration of the process management system 105. The process management system 105 includes an MIS (management information system) server 201, and a document submission system server 202, a file server 203, and client PCs 204 and 205, which are connected to the network 107.

The MIS server 201 manages a workflow in the entire system from order to delivery and integrally controls various management information and sales information. The MIS server 201 performs inventory management of sheets and toner, calculation of an estimated price using a predicted value of the amount of consumption of toner used for a requested print job, management of cost data used for the calculation of the estimated price, and the like.

The document submission system server 202 receives a job from the end-user environment 101 or 102 via the Internet 103. The received job is managed by a job identification (ID) number. Information necessary for management such as the ID number and client information is sent to the MIS server 201. The document submission system server 202 also sends the information such as the management information and image data to a downstream system (process) in accordance with an instruction of the MIS server 201.

The file server 203 stores a job received from an end user in order to prepare for a repeat order regarding the same original document from the end user. In general, the file server 203 stores image data together with job setting information (job ticket) of the previous output.

Such information is sent and received to and from the above devices in the process management system 105 using a job ticket format called JDF (job definition format) or the like describing a task instruction concerning a corresponding job. The devices in the process management system 105 allow automation of a total workflow in cooperation with the downstream systems centered around the process management system 105, by transferring a job thicket together with image data as a job and issuing a control command.

[Configuration of Prepress System]

Figure 3:
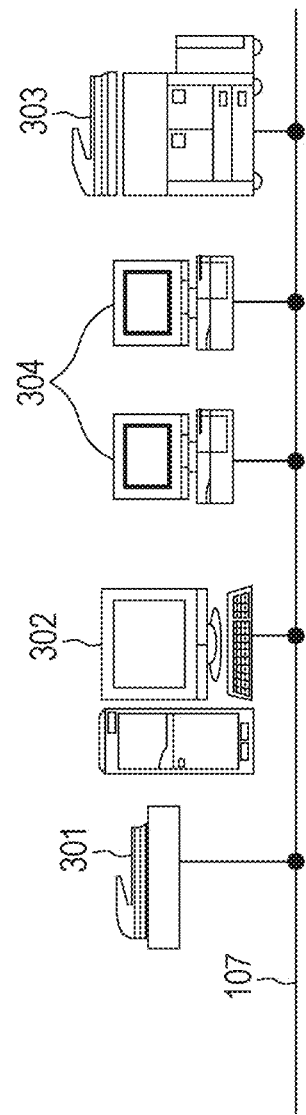
FIG. 3 illustrates a configuration of a prepress system according to an exemplary embodiment of the present invention.

FIG. 3 illustrates an example of a configuration of the prepress system 106.

A prepress server 302 scans an original document sheet received from an end user by using a scanning device such as a scanner 301 and an MFP 303 to load the document sheet as a scanned image file. Then, the prepress server 302 performs image correction such as skew correction and black spot removal. The prepress server 302 also merges a plurality of document/image files received from the end user and a plurality of scanned image files scanned by the scanning device. In addition, the prepress server 302 carries out various page layout editing and imposition processing, such as page insertion/deletion, addition of page numbers and annotations, insertion of an index sheet, a cover, and an interleaf, and designation of N-up printing or multiple-page printing.

The prepress system 106 may be composed of the single prepress server 302 and a plurality of client PCs 304, as illustrated in FIG. 3.

When a job received by the prepress system 106 is a copy job, an operator first scans the original document sheet using the scanning device such as the scanner 301 and the MFP 303 and loads the scanned document into the prepress server 302 or the client PCs 304 as a scanned image file. At this time, the operator performs various correction processing as described above. On the other hand, when the received job is a print job, the operator loads a document/image file from the end user into the prepress server 302 or the client PCs 304. If there are a plurality of document/image files received from the end user or scanned image files obtained by scanning using the scanning device, the files are merged.

Such a document/image file received from the end user or a scanned image file obtained by scanning using the scanning device may need to be further edited. For example, the operator may insert a page from another file into the file to be edited or delete a page in the file while checking the layout of a plurality of pages.

In addition, for example, the operator may add page numbers and annotation (character or image such as a watermark indicating confidentiality and a logo) and designate N-up printing or multiple-page printing (printing of multiple pages laid out on a single printing plate). Further, the operator may carry out various page layout editing and imposition processing, such as insertion of an index sheet, a cover, and an interleaf, and designation of postpress processing such as stapling, punching, and Z-folding.

The prepress system 106 is capable of cooperating with a database constructed in the prepress server 302 or another server to realize one-to-one marketing, such as printing of addresses for direct mails and brochures for individual customers. Thus, the prepress system 106 realizes a variable printing system in which an address or other related data are continuously replaced with another one while multiple copies of the same document are printed.

In the printing industry, there is a form of output called color comprehensive layout (color comp). The purpose of color comp is to make a presentation to an end user such as an advertiser before entering plate-making and printing processes.

Recently, such color comp uses a color hard copy obtained by outputting a digital image by using an image forming device such as an MFP. Such a digital image is processed by DTP (desktop publishing), which produces a publication using a personal computer, or CEPS (color electronic prepress system), which is used for image correction or image combining in a printing process. In POD using MFPs or the like, a proof output by an MFP to be used in actual printing is possible for both layout checking and brief color checking corresponding to a color comp and detailed color checking corresponding to proofing. In the prepress system 106, it is possible to output a proof from an MFP to check the layout and color of a final product according to need.

[Configuration of Digital Printing System]

Figure 4:
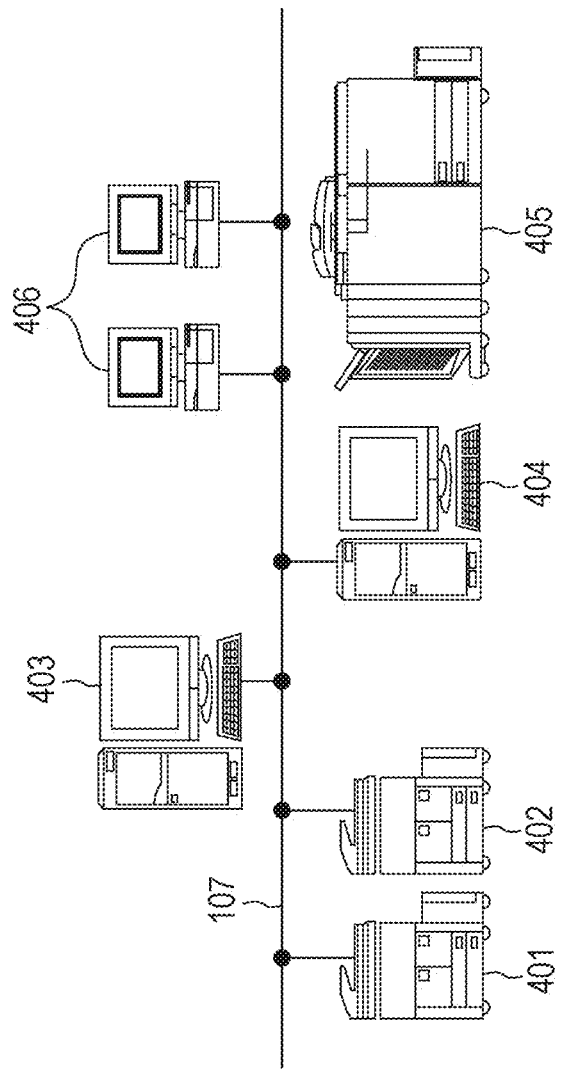
FIG. 4 illustrates a configuration of a digital printing system according to an exemplary embodiment of the present invention.

FIG. 4 illustrates an example of a configuration of the digital printing system 108.

The digital printing system 108 includes a print server 403, a color MFP 401, a black-and-white (B/W) MFP 402, a high-speed color MFP 405, and at least one client PC 406.

The print server 403 has the following two functions. One is to send and receive information to and from a device or the like located outside the digital printing system 108. The print server 403 first receives image data and setting information regarding an input job and informs the external device of job status information or the like when the job is completed. The other is to manage and control a device or the like within the digital printing system 108. The print server 403 performs centralized management of jobs input from external devices and information generated within the system.

Using the print server 403, the statuses of all internal devices and jobs can be monitored, and various control can also be performed, such as pause, setting change, printing resumption, and duplication, transfer, and deletion of the jobs.

The client PC 406 serves to edit an input file, instruct execution of printing, and supply a ready-to-print file and also serves to support the monitoring and control of the devices and jobs managed within the print server 403.

The color MFP 401, the B/W MFP 402, and the high-speed color MFP 405 are image forming devices having various functions including scanning, printing, and copying. Since the color MFP 401, the B/W MFP 402, and the high-speed color MFP 405 are different from each other in terms of the processing speed, cost, and the like, it is necessary to select one in accordance with the application. The high-speed color MFP 405 is connected to an external controller 404 for performing high-speed RIP (raster image processor or processing). The external controller 404 performs RIP based on an input print command, and also predicts the amount of toner consumption and sends a predicted value to the MIS server 201.

[Configuration of Postpress System]

Figure 5:
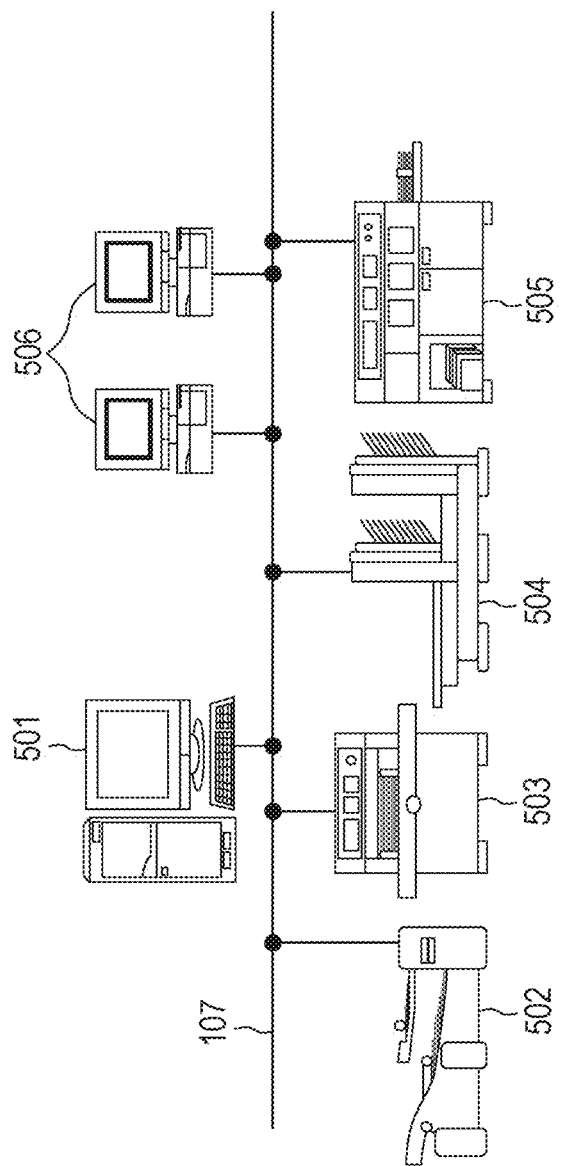
FIG. 5 illustrates a configuration of a postpress system according to an exemplary embodiment of the present invention.

FIG. 5 illustrates an example of a configuration of the postpress system 109.

The postpress system 109 includes a postpress server 501, at least one client PC 506, and postpress processing devices including a folding machine 502, a trimming machine 503, a saddle-stitching machine 504, and a case-biding machine 505.

The postpress server 501 may be a computer for integrally managing postpress processes. The postpress server 501 sets conditions for postpress processing that can be performed by the postpress system 109 on the basis of a job instruction received in the document submission system server 202 and a job instruction supplied from the MIS server 201. The postpress server 501 thus provides instructions regarding postpress processes that meet a request from an end user. In general, the postpress server 501 allows exchange of information such as a command and status information between devices located outside the postpress system 109 and the postpress devices within the postpress system 109 using an information file such as JDF. The postpress processes that can be performed by the postpress devices include a trimming process, a saddle-stitching process, a case-binding process, a folding process, a punching process, an inserting process, and a collating process. The postpress system 109 performs control of these processes so as to provide a final product processed into a form requested by an end user.

The postpress server 501 keeps track of the state of each device and job status to manage jobs by sequentially polling the postpress devices in the system using a predetermined protocol. In this exemplary embodiment, the above postpress processes may be carried out either by the respective devices or by a single device.

[Procedure of Processing of Document Submission Management System]

A document submission management system herein refers to a system composed at least of the MIS server 201 and the document submission system server 202 and is capable of communicating with a device performing RIP in actual printing and an image forming device having information necessary for execution of a job. The document submission management system may also be composed of a single device. In that case, the functions of the MIS server 201 and the document submission system server 202 are realized by a single device. Processing to be performed by the document submission management system may be realized by causing a CPU in each device constituting the system to execute a program that realizes the processing.

Figure 6:
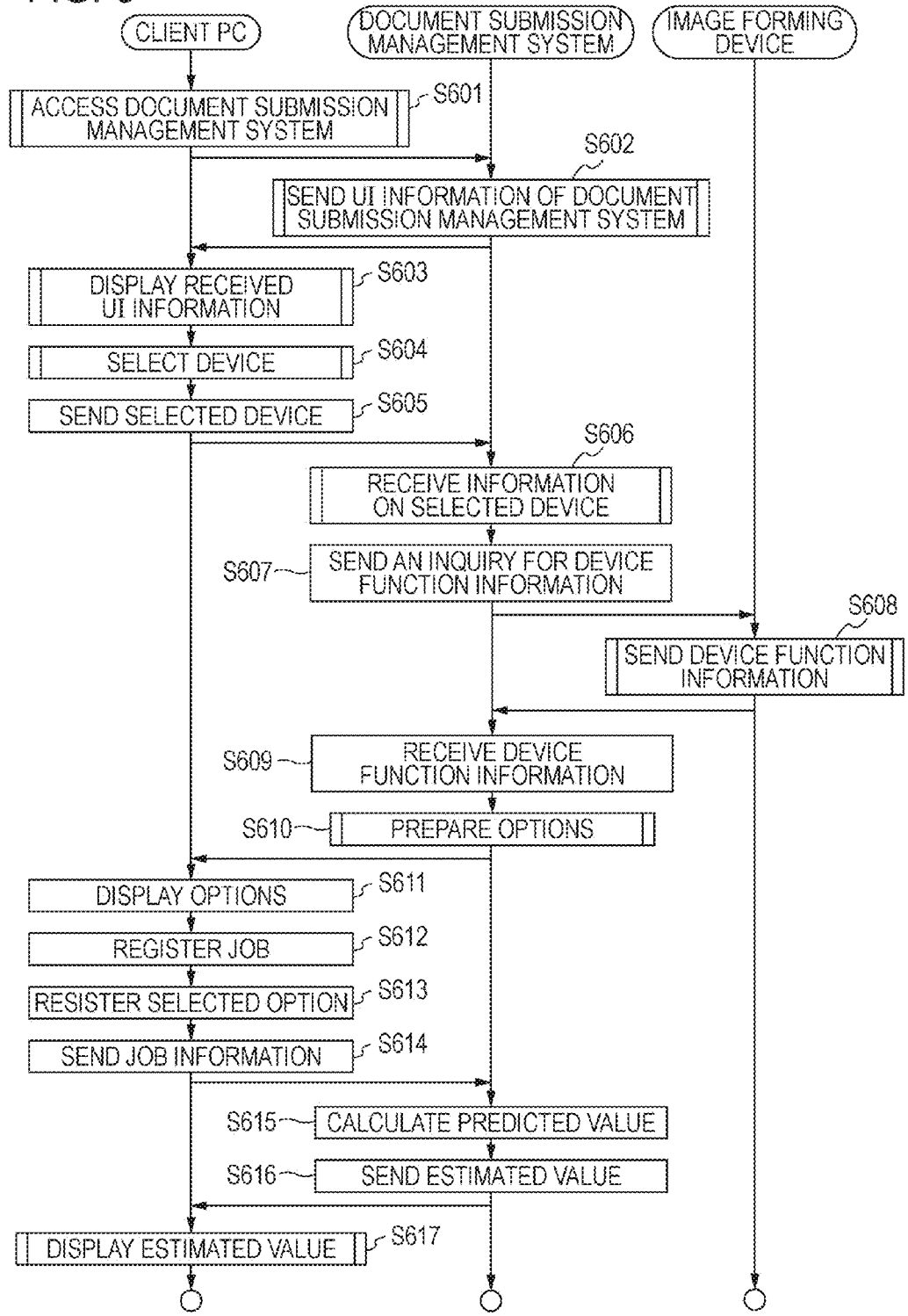
FIG. 6 is a flowchart illustrating processing performed by devices centered around a document submission management system according to an exemplary embodiment of the present invention.

Referring to FIG. 6, a processing procedure performed by the devices centered around the document submission management system will be described.

At Step S601, when an end user operating one of the client PC 204s inputs an instruction to access the document submission management system, the client PC 204 sends the document submission management system a connection request to access the document submission management system.

In response to the connection request, at Step S602, the document submission management system sends the client PC 204 information regarding a user interface (UI) for providing the functions of the document submission management system. By this processing, the end user is provided with a UI.

Upon receiving the UI information from the document submission management system, at Step S603, the client PC 204 displays the UI on a display device in accordance with the received information.

At Step S604, the client PC 204 selects a device designated by the end user using the UI. The device to be selected may be an image forming device which the end user desires to use for actual printing. The end user is to designate a device while taking into account the printing speed, quality, and the like. Then, at Step S605, the client PC 204 sends information regarding the selected device to the document submission management system.

At Step S606, the document submission management system receives the device information from the client PC 204. The device information may include any of the following: information such as an ID for identifying the image forming device; information designating the printing speed, printing quality, etc.; and information indicating a printing method.

On the basis of the received device information, at Step S607, the document submission management system sends a corresponding device an inquiry for device function information. For example, when the end user designates a high-speed, high-quality printer, the document submission management system sends a corresponding device allowing communication an inquiry for the device name, the printing speed, management information to be referred to, executable print options, and the like.

At Step S608, the device that has received the inquiry for device function information sends the document submission management system information on the functions thereof.

At Step S609, the document submission management system receives the device function information. At Step S610, the document submission management system prepares options to be displayed on the client PC 204 based on the received device function information and sends the client PC 204 information regarding the options.

On the basis of the received information, at Step S611, the client PC 204 displays the options in the UI. The options to be displayed include information on a stamp, a watermark, and a character string to be printed out and option settings available in the device.

On the basis of an instruction input from the user through the UI, at Step S612, the client PC 204 registers image data and information on the original document as a print job data. Then, at Step S613, the client PC 204 registers a selected optional function as print job data in accordance with a designation input from the end user through the UI. When the registration of the print job data is completed, at Step S614, the client PC 204 sends the registered print job data to the document submission management system.

At Step S615, the document submission management system calculates predicted values of the amounts of consumption of consumables to be used for performing printing. In this exemplary embodiment, an image forming device, an RIP controller, or the like are provided within the document submission management system so that the predicted values is calculated within the system. It is also possible that the document submission management system obtains predicted values of the amounts of consumption of consumables by requesting an external device (e.g., a device designated by the end user) to calculate the predicted values.

At Step S616, the document submission management system calculates an estimate value based on the predicted values of the amounts of consumption of the consumables required for printing and sends the client PC 204 an estimated value. The estimated value includes a fee based on a predicted value of the amount of toner consumption, a cost for sheets to be consumed, a fee for performing a selected optional function, a labor cost, and the like.

At S617, the client PC 204 outputs the received estimated value to the UI on the display thereof.

In accordance with the procedure described above, the estimated value indicating the cost for printing processing according to an order from the end user is provided to the end user. The processing beginning with Step S603 up to Step S617 may be repeated in accordance with an instruction input via the UI of the end user. In this exemplary embodiment, the end user is allowed to select a desired printer and easily check a result of a change in an estimated value caused by a modification of the selection of optional functions. It is also possible to display a predicted value of the amount of consumption of a consumable that has been calculated in the processing of Step S615 (e.g., the predicted value of the amount of consumption of each color toner to be used) in addition to the fee as an estimation result.

[UI Screen]

Figure 7:
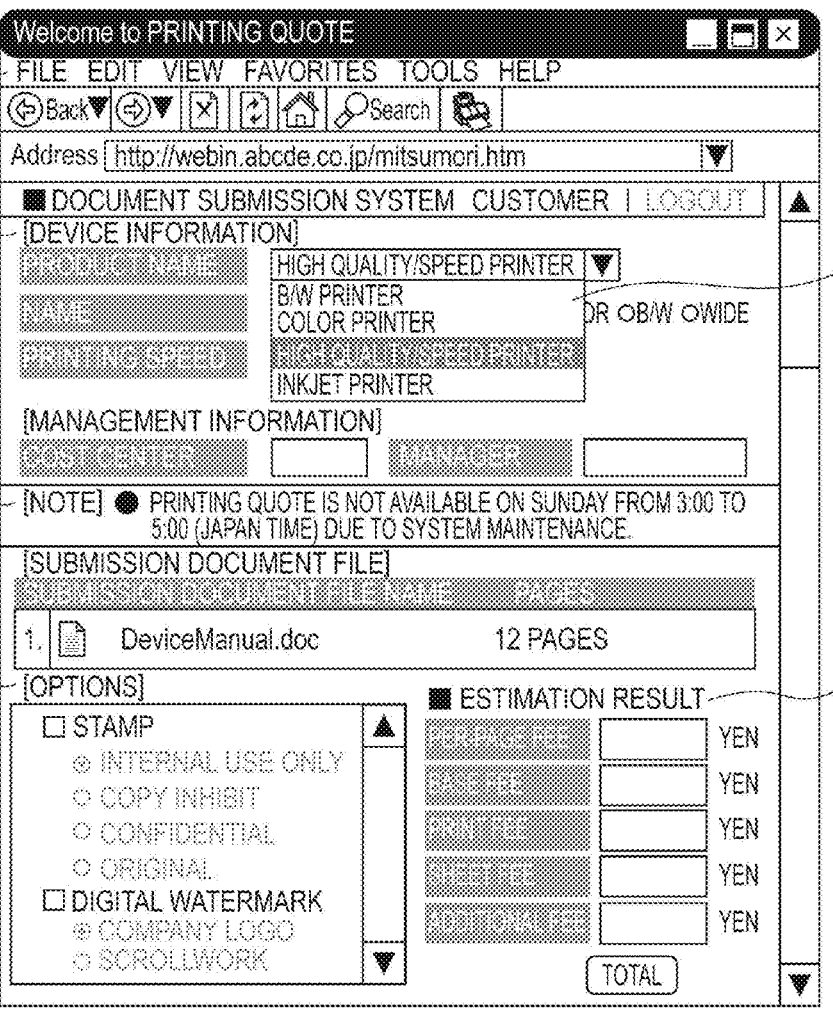
FIG. 7 illustrates an example of a user interface provided by the document submission management system according to an exemplary embodiment of the present invention.

Referring to FIG. 7 to FIG. 9, a layout of a UI screen provided from the document submission management system to a client PC.

FIG. 7 illustrates a UI screen corresponding to the processing of Step S603 and Step S604 described above. An entire screen 701 is used when a print job is input to the document submission system server 202. For example, the screen 701 may be displayed in a predetermined browser using a Web service. The screen 701 includes a section 702 allowing designation of device information, a section 703 allowing registration of submission document file information, a section 704 allowing selection of optional functions of a device to be used, and a section 705 allowing display of an estimation result.

The section 702 allowing designation of device information displays information regarding devices connected to the document submission management system and allows the end user to designate a device. The section 702 displays function information corresponding to the device selected using a device selection field 706. Referring to FIG. 8, function information corresponding to a high-speed, high-quality printer which has been designated by the end user is displayed.

The section 703 displays information regarding a submission document file (DeviceManual.doc) to be actually registered by the end user as print job data.

The section 704 displays a list of available optional functions of the device selected using the device selection field 706, allowing a selected function to be set in the print job.

The section 705 displays the result of estimation for the print job received from the document submission management system. As illustrated in FIG. 8, it is also possible to communicate with the document submission management system before receiving the estimation result, so as to display in a display field 802 a rough indication of the cost for a function 801 selected by the end user using the section 704. When the end user clicks an "Enter" button 803 after selecting all desired functions, designated information is determined and sent to the document submission management system.

As a result, as illustrated in FIG. 9, a list of functions selected by the end user and information 904 indicating an estimated cost (value) calculated based on the selected functions. In this case, the estimated value includes a base fee including the labor cost, a print fee including the cost of toner to be consumed, a sheet fee, etc.

The end user performs final check of the selected items and clicks a "Start printing" button 905 to start printing. When a modification of the selection of items is necessary, the end user resets the selected items by clicking a "Correct" button 906. When the "Correct" button 906 is clicked, the display of a "Start printing" button 905 and the "Correct" button 906 are switched to the display of the "Enter" button 803 to start over the estimation again.

[Calculation of Amount of Consumption of Consumable for PDL Data]

Figure 11:
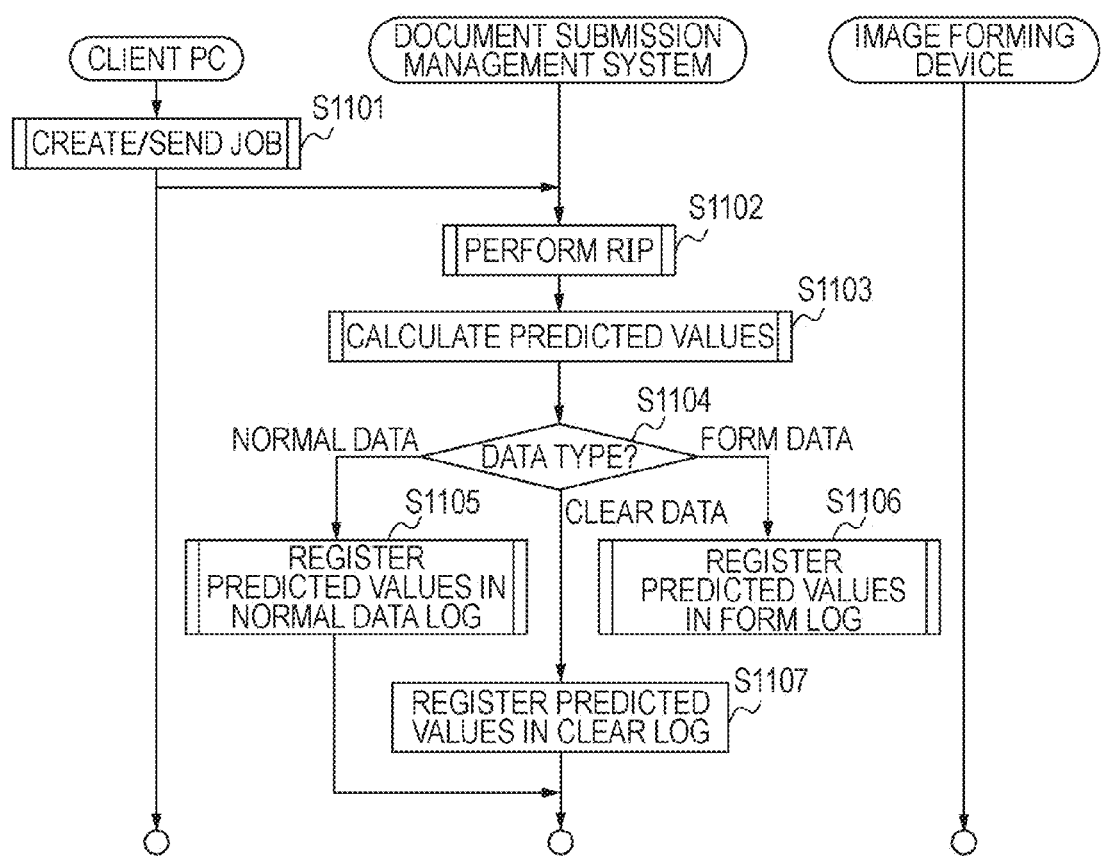
FIG. 11 is a flowchart illustrating the processing illustrated in FIG. 10.

Referring to FIG. 10 and FIG. 11, a procedure for calculating predicted values of the amounts of consumption of consumables for PDL (page description language) data. The document submission management system is provided with a database storing a history of predicted values of the amounts of consumption of consumables.

Referring to FIG. 10, the outline of the processing procedure will be described. First, print data 1001 is created by an end user or the like using the client PC 204 and registered in a document submission management system 1003. The print data 1001 may be a stamp image used for a stamp function realized by general monochrome or color toner or may be form data (form document data) used for form overlay printing. The print data 1001 may also be data for clear toner printing for coating a printed material to give it a glossy appearance. Such print data is RIPed in advance by the document submission management system 1003. Predicted values of the amounts of consumption of consumables used for the print data 1001 are calculated, and each of the predicted values is stored together with the ID identifying the print data 1001 in advance in the document submission management system 1003 as log data.

FIG. 11 is a flowchart illustrating in detail the processing described above with reference to FIG. 10.

At Step S1101, the client PC 204 creates the print data 1001 and sends the print data 1001 to the document submission management system 1003.

At Step S1102, the document submission management system 1003 performs RIP on the print data 1001 received from the client PC 204. Then, at Step S1103, the document submission management system 1003 calculates a predicted value of the amount of consumption of each consumable.

At Step S1104, the document submission management system 1003 determines the type of the print data 1001 received from the client PC 204. When the type is indicative of data used for normal printing, of registration of form data, or of registration of data for clear toner printing, the procedure proceeds to Step S1105, S1106, or S1107, respectively.

At Step S1105, the document submission management system 1003 registers the result of the calculation performed in Step S1103 in a normal data log 1004 together with the ID identifying the print data 1001. At Step S1106, the document submission management system 1003 registers the calculation result in a form log 1005 together with the ID identifying the print data 1001. At Step S1107, the document submission management system 1003 registers the calculation result in a clear log 1006 together with the ID identifying the print data 1001.

In this exemplary embodiment, an ID of form data or the like to be registered in advance is set from a client PC. However, it may also be configured such that the ID is automatically issued when the form data is registered in a log in the document submission management system 1003 and sent to the client PC.

[Calculation of Predicted Value of Amount of Consumption of Consumable for Combined Data]

Figure 12:
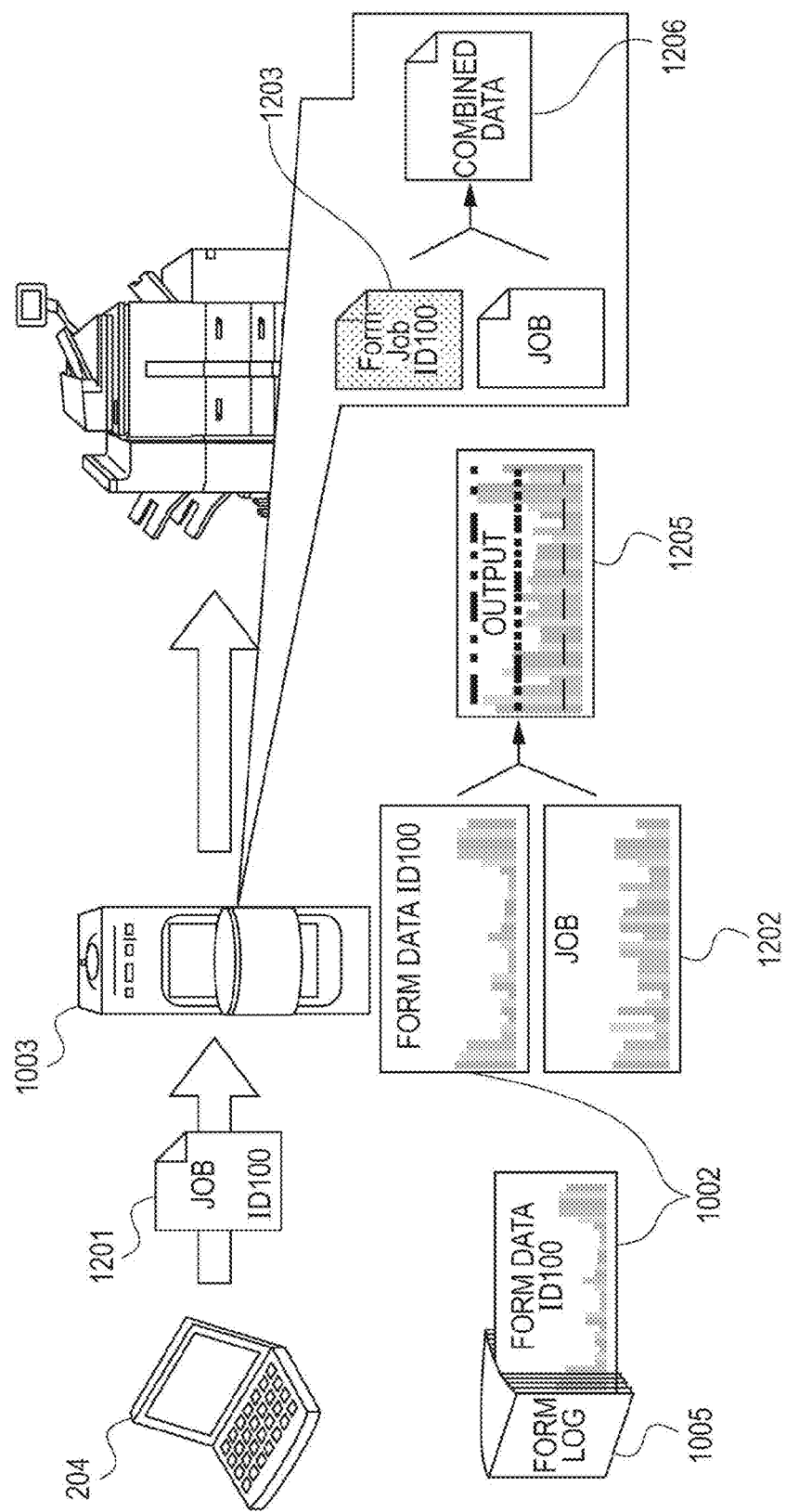
FIG. 12 schematically illustrates calculation processing of a predicted value of the amount of consumption of a consumable used for print output of combined image data in a document submission management system according to the first exemplary embodiment of the present invention.
Figure 13:
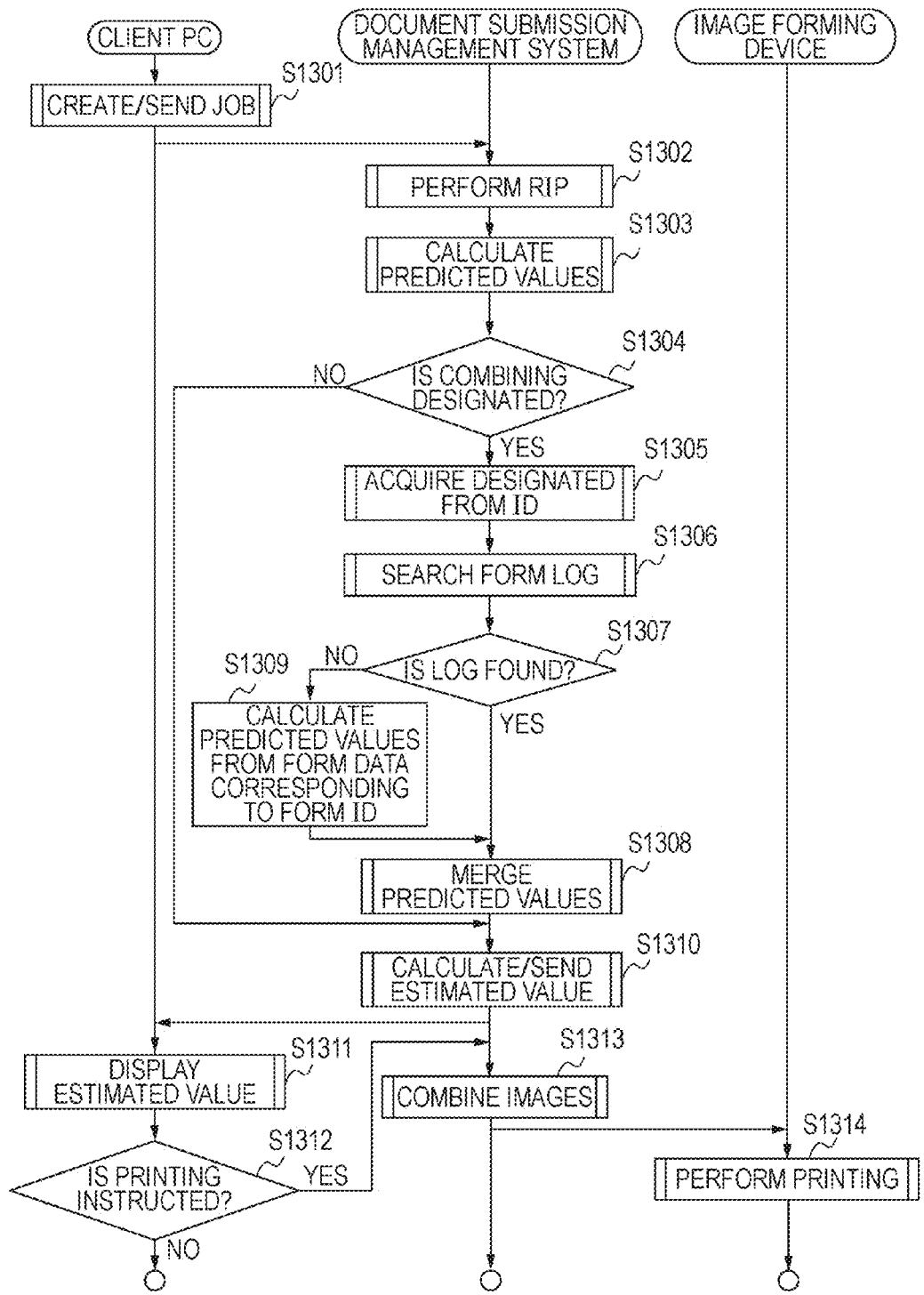
FIG. 13 is a flowchart illustrating the processing illustrated in FIG. 12.

Referring to FIG. 12 and FIG. 13, a procedure for calculating a predicted value of the amount of consumption of a consumable in a case where a plurality of pieces of PDL data are combined and printed.

Referring to FIG. 12, the outline of the procedure will be described. First, a job 1201 is created by an end user or the like using the client PC 204 and registered in the document submission management system 1003. At this time, it is assumed that the end user designates a specific form (e.g., stamp) and designates a job in which the form is combined with another data piece and printed. The document submission management system 1003 calculates predicted values 1205 of the amounts of consumption of consumables used when the PDL data registered in the job and the designated form data 1203, which have been RIPed, for example, are combined and output. For the form data, when the corresponding form ID which has been registered in the form log 1005 or the like is indicated, the calculation of the predicted values can be omitted and the corresponding predicted values (e.g., 1002) can be called from the form log 1005.

FIG. 13 is a flowchart illustrating in detail the above procedure described using FIG. 12. Each of processing step described herein is implemented by a control program stored in each system and device and executed by a CPU.

At Step S1301, the client PC 204 creates the job 1201 including print data in accordance with an instruction of an end user and sends the job 1201 to the document submission management system 1003.

At Step S1302, the document submission management system 1003 performs RIP on the PDL data contained in the job 1201 received from the client PC 204. At Step S1303, the document submission management system 1003 calculates predicted values 1202 of the amounts of consumption of consumables on the basis of the RIPed data.

At Step S1304, it is determined if the job 1201 includes a designation to combine the print data with form data. If such data combining is designated in the job 1201, the procedure proceeds to Step S1305, and if not, the procedure proceeds to Step S1309.

At Step S1305, the document submission management system 1003 acquires a form ID designated in the job. Then, at Step S1306, the document submission management system searches the form log 1005 for a predicted value of the amount of consumption of a consumable corresponding to the form data corresponding to the ID acquired in Step S1305. Subsequently, at Step S1307, if the corresponding predicted value is found as a result of the search in Step S1306, the procedure proceeds to Step S1308, and if not, the procedure proceeds to Step S1309.

At Step S1309, the document submission management system 1003 searches the system for the form data corresponding to the form ID acquired in Step S1305 to obtain the form data. The form data to be obtained at this step is supposed to have been registered but corresponding predicted values of the amounts of consumption of consumables have not been calculated. Thus, the predicted values are calculated. It is also possible to obtain form data stored in a storage area in a database or an image forming device located outside the document submission management system 1003 by sending an inquiry. Also in this a case, predicted values of the amounts of consumption of the consumables for the form data obtained from the external device or database is similarly calculated.

At Step S1308, the document submission management system 1003 merges the predicted values 1202 for the print data calculated in Step S1303 and the predicted values for the form data corresponding to the form ID acquired in Step S1305. By this merging, the predicted value of the amount of consumption of each consumable used for print output of a combined image 1206 obtained as a result of data combining designated in the job.

At Step S1310, the document submission management system 1003 calculate an estimate of the cost of printing from the merged predicted values and sends the estimated value to the client PC 204. As mentioned above, the estimated value to be calculated may include a fee based on a predicted value of toner consumption, the cost for sheets to be used, a fee for a selected optional function, a fee including a labor cost, and the like. It is also possible to include the predicted values 1205 calculated in Step S1308 in the estimation result.

At Step S1311, the client PC 204 displays the received estimated values in a UI. At Step S1312, the client PC 204 determines whether or not the end user has input the print instruction through the UI. If the print instruction has been input, the client PC 204 sends the print instruction to the document submission management system 1003, and if not, the procedure is terminated.

At Step S1313, the document submission management system 1003 generates the image 1206 representing the data combining designated in the job as described above. The document submission management system 1003 sends the combined image data to the image forming device for print output. At Step S1314, the image forming device prints the received image data.

In this exemplary embodiment, data combining using form data is performed by the document submission management system 1003. However, such data combining may be performed by the image forming device. In such a case, transmission of form data from the image forming device to the document submission management system 1003 can be omitted if the form data has been registered in the image forming device and also if a history of predicted values corresponding to the form data is saved in the form log of the document submission management system 1003. Assuming the image forming device performing data combining instead of the document submission management system 1003, the processing load of the document submission management system 1003 can be reduced.

Second Exemplary Embodiment

[Calculation of Predicted Value of Amount of Consumption of Consumable for Data Registered in Image Forming Device]

Figure 14:
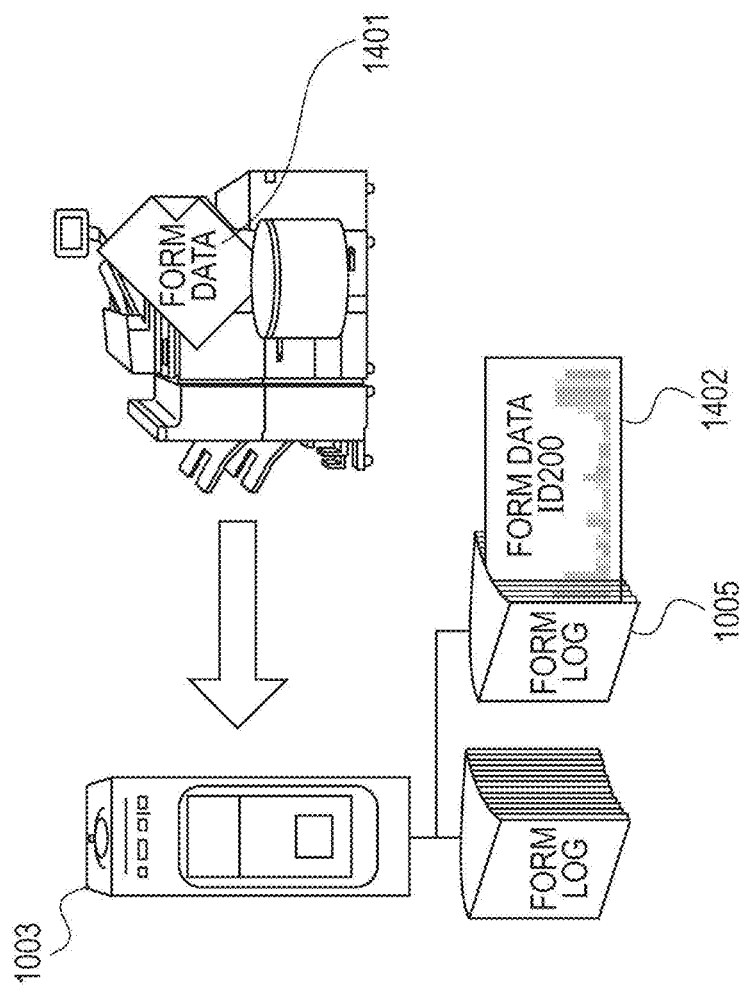
FIG. 14 schematically illustrates calculation processing of a predicted value of the amount of consumption of a consumable which is performed when form data is registered in an image forming device, according to a second exemplary embodiment of the present invention.
Figure 15:
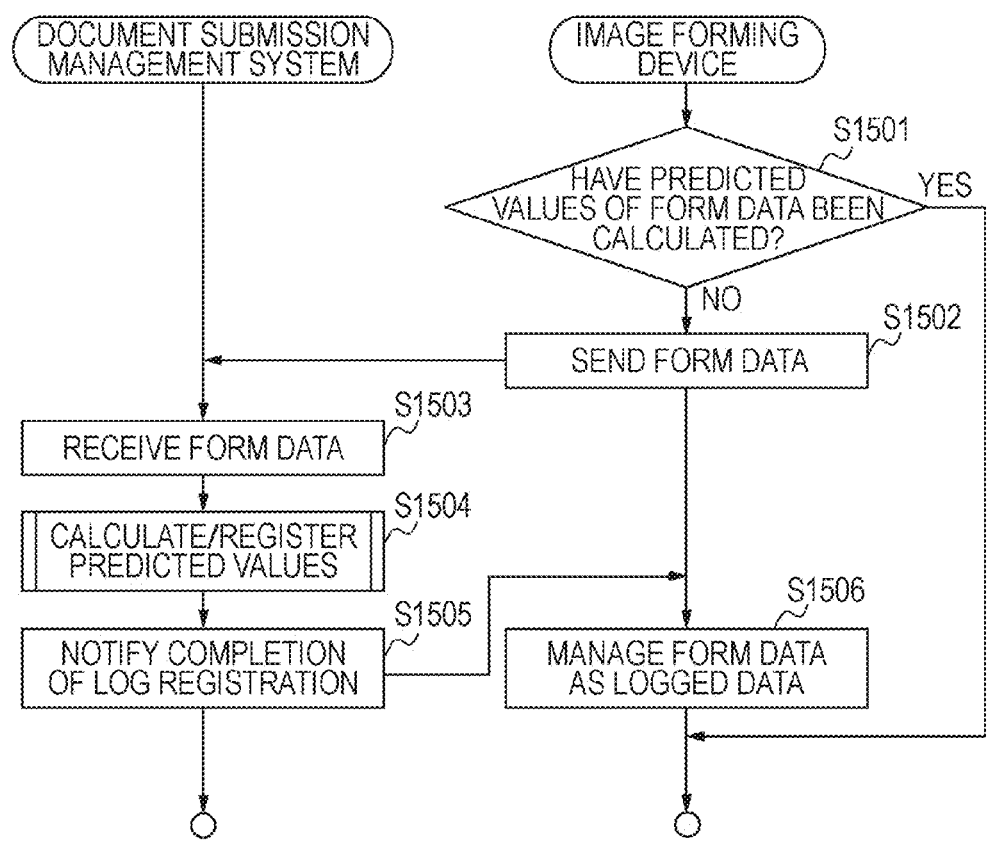
FIG. 15 is a flowchart illustrating the processing illustrated in FIG. 14.

Referring to FIG. 14 and FIG. 15, a procedure for calculating predicted values of the amounts of consumption of consumables when form data such as stamp data and form document data is registered in an image forming device.

In FIG. 14, when form data 1401 is registered in an image forming device, the image forming device sends the registered data to the document submission management system 1003. The document submission management system 1003 performs RIP or the like on the received form data 1401 if necessary and calculates predicted values 1402 of the amounts of consumption of consumables for the received form data 1401. Then, the document submission management system 1003 registers the calculated predicted values 1402 and a corresponding form ID in the form log 1005 and notifies the image forming device of the registration. Upon receiving the notification, the image forming device manages the form data as logged data.

FIG. 15 is a flowchart illustrating a procedure of the processing described above with reference to FIG. 14. Each processing step described herein is realized by a control program stored in each system and device and executed by a CPU.

At Step S1501, when form data is registered in a storage area of the image forming device, the image forming device determines whether or not predicted values of the amounts of consumption of consumables for the registered form data have been calculated. That is, it is determined whether or not predicted values corresponding to the form data have been registered as log data in the document submission management system 1003. For form data, if corresponding predicted values have been calculated in the document submission management system 1003, the form data is managed by using a "done" flag or the like, so that it can be recognized that the corresponding predicted values have been calculated. Note that it is also possible that the image forming device periodically performs the above determination processing on form data registered in the storage area of the image forming device.

If, in Step S1501, it is determined that predicted values of the amounts of consumption of consumables for the form data have not been calculated, the procedure proceeds to Step S1502. At Step S1502, the image forming device sends the form data 1401 to the document submission management system 1003 using a network connection function. If, in Step S1501, it is determined that predicted values of the amounts of consumption of consumables for the registered form data have been calculated, the procedure is terminated.

At Step S1503, the document submission management system 1003 receives the form data 1401 from the image forming device.

At Step S1504, the document submission management system 1003 calculates the predicted values 1402 of the amounts of consumption of consumables for the form data 1401. At this time, when the form data 1401 is PDL data, the document submission management system 1003 performs RIP or the like before calculating the predicted values. The calculated predicted values 1402 are registered in the form log 1005 in a storage area in the document submission management system 1003 together with the corresponding form ID 200 as log data.

At Step S1505, the document submission management system 1003 sends the image forming device a notification together with the form ID, indicating that the predicted values 1402 corresponding to the form data 1401 have been registered as log data.

At Step S1506, on the basis of the notification sent from the document submission management system 1003, the image forming device manages the form data 1401 identified by the notified form ID as logged data.

Note that the calculation of a predicted value of the amount of consumption of a consumable which is to be performed in the document submission management system 1003 in advance before execution of printing is instructed may be carried out by polling image forming devices connected over a network or the like when the document submission management system 1003 is activated.

The above exemplary embodiment illustrates the case of data registration from outside the image forming device. However, the above-described processing may similarly be performed when form data of a form document or the like is registered in the image forming device using a scanner provided therein. In such a case, image data read by the scanner in the image forming device is stored as form data in a predetermined storage area together with a form ID. After that, the image forming device communicates with the document submission management system 1003, so that predicted values of the amounts of consumption of consumables for the scanned data are calculated and registered as log data.

Third Exemplary Embodiment

[Automatic Deletion of Log Data]

Figure 16:
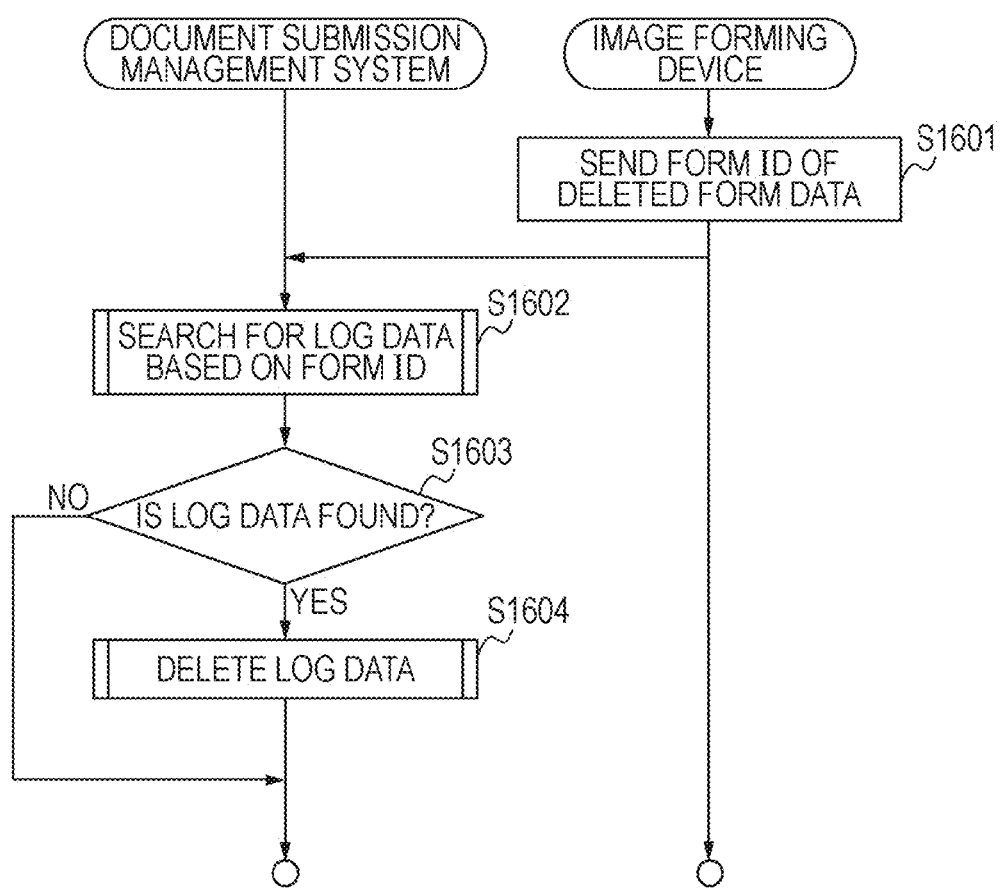
FIG. 16 is a flowchart illustrating an automatic deletion processing of a predicted value according to a third exemplary embodiment of the present invention.

Referring to FIG. 16, a procedure for automatically deleting a predicted value of the amount of consumption of a consumable which has been registered as log data. FIG. 16 is a flowchart illustrating such automatic deletion processing. Each processing step described below is realized by a control program stored in each system and device and executed by a CPU.

At Step S1601, when form data stored in a predetermined storage area such as a hard disk in the image forming device is deleted, the image forming device notifies the document submission management system 1003 of the form ID of the deleted form data.

Then, at Step S1602, on the basis of the notified form ID, the document submission management system 1003 searches the form log 1005 for corresponding log data. At Step S1603, when corresponding log data is found, the procedure proceeds to Step S1604, and if not, the procedure is terminated.

At Step S1604, the document submission management system 1003 deletes the corresponding log data from the form log 1005.

With the above procedure, the form data is deleted by the device in which the form data has originally been registered. That is, since the form data is assumed not to be used in the future, the corresponding predicted values of the amounts of consumption of consumables which have been registered in the document submission management system 1003 as log data are automatically deleted from the system. This automatic deletion allows effective use of the storage area.

Other Exemplary Embodiments

In the following, additional description and the description of other exemplary embodiments of the present invention will be provided for further understanding of the present invention.

[Schematic Illustration of Hardware of Image Processor]

Figure 17:
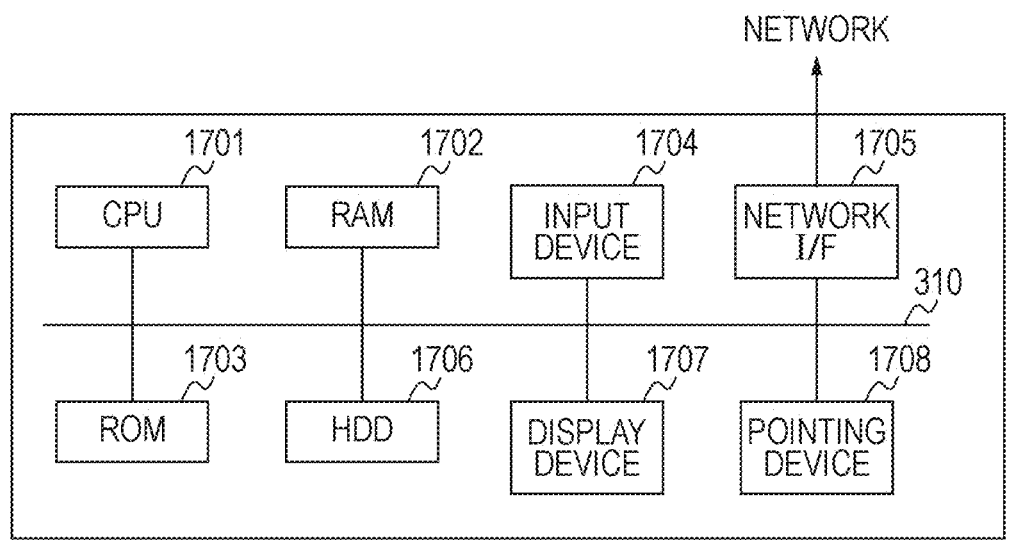
FIG. 17 schematically illustrates hardware of information processor used in an exemplary embodiment of the present invention.

FIG. 17 is a block diagram illustrating a hardware configuration of an image processor such as the MIS server 201, the document submission system server 202, and a client PC (client terminal).

In FIG. 17, a CPU 1701, a RAM (random access memory) 1702, a ROM (read-only memory) 1703, an input device 1704 such as a keyboard, a network interface (I/F) 1705, and a hard disk drive (HDD) 1706 are interconnected via a system bus 1710. In addition, a display device 1707 such as a CRT (cathode-ray tube) display and a pointing device 1708 such as a mouse are interconnected via the system bus 1710.

A control program is prestored the ROM 1703 or the HDD 1706. The CPU 1701 realizes computer functions for performing the processing in the above embodiments by reading the control program from the ROM 1703 or the HDD 1706 into the RAM 1702 according to need and executing the control program. For example, a form log, a clear log and the like according to the above exemplary embodiments are stored in the HDD 1706. Specifically, by executing the control program, a module, such as a calculation module for calculating a predicted value of the amount of consumption of a consumable in the document submission management system and a registration module for registering the calculated predicted value in the form log, is called to realize the processing.

The CPU 1701 performs control regarding display of various types of information through the display device 1707 and also performs control regarding reception of a designation from the user or the like through the input device 1704 and the pointing device 1708. Further, the CPU 1701 communicates with other devices over a network via the network I/F 1705 serving as a network connection unit.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-223412 filed on Sep. 1, 2008, which is hereby incorporated by reference herein in its entirety.

What is claimed is:

1. A document submission management system provided with a memory, for managing processing related to printing processing according to an order from a user through a client terminal, the system comprising:

a calculating unit configured to calculate, from image data, a predicted value of the amount of consumption of a consumable used for printing the image data;

a registering unit configured to calculate, using the calculating unit, a predicted value of the amount of consumption of a consumable used for printing form data available for the order from the user and registers the calculated predicted value and an ID for identifying the form data in the memory as log data;

a user interface providing unit configured to provide information for providing the client terminal with a user interface screen for performing setting regarding the order from the user;

an estimating unit configured to, when an order for printing processing using first form data is placed by the user through the user interface screen provided by the user interface providing unit, estimate a cost for the printing processing according to the order from the user based on the predicted value as an estimated value, by utilizing the log data registered by the registering unit, without calculating by the calculating unit, the predicted value of the amount of consumption of the consumable used for printing the first form data selected by the user;

a form acquiring unit configured to acquire second form data from an image forming device connected via a network in a case where an ID of the second form data selected by the user through the user interface screen provided by the user interface providing unit is not registered as the log data and the second form data has been registered in the image forming device; and a transmitting unit configured to transmit the estimated value obtained by the estimating unit to the client terminal, wherein the estimating unit estimates the cost for the printing processing according to the order from the user based on a predicted value of the amount of consumption of the consumable used for printing the second form data by utilizing calculating by the calculating unit, when the ID of the second form data is not registered as the log data.

2. The document submission management system of claim 1, wherein when form data is newly registered in the image forming device or a database, the form acquiring unit acquires the newly registered form data, and the registering unit calculates, using the calculating unit, a predicted value of the amount of consumption of a consumable used for printing the newly registered form data acquired by the form acquiring unit and registers the predicted value and an ID for identifying the newly registered form data in the memory as log data.

3. A document submission management method for a document submission management system for managing processing related to printing processing according to an order from a user through a client terminal, the method comprising the steps of:

calculating from image data a predicted value of the amount of consumption of a consumable used for printing the image data;

registering a predicted value of the amount of consumption of a consumable used for printing form data available for the order from the user, the predicted value being calculated in the calculating step, and an ID for identifying the form data, in a memory as log data;

providing information for providing the client terminal with a user interface screen for performing setting regarding the order from the user;

estimating when an order for printing processing using first form data is placed by the user through the provided user interface screen, a cost for the printing processing according to the order from the user as an estimated value based on the predicted value, by utilizing the registered log data, without calculating in the calculating step, the predicted value of the amount of consumption of the consumable used for printing the first form data selected by the user;

acquiring second form data from an image forming device connected via a network in a case where an ID of the second form data selected by the user through the user interface screen provided by the providing step is not registered as the log data and the second form data has been registered in the image forming device; and transmitting the estimated value to the client terminal, wherein the estimating step estimates the cost for the printing processing according to the order from the user based on a predicted value of the amount of consumption of the consumable used for printing the second form data by utilizing calculating by the calculating step, when the ID of the second form data is not registered as the log data.

4. A non-transitory computer readable storage medium storing a computer program for causing a computer to execute a method for managing processing related to printing processing according to an order from a user through a client terminal, the method comprising the steps of:

calculating from image data a predicted value of the amount of consumption of a consumable used for printing the image data;

registering a predicted value of the amount of consumption of a consumable used for printing form data available for the order from the user, the predicted value being calculated in the calculating step, and an ID for identifying the form data, in a memory as log data;

providing information for providing the client terminal with a user interface screen for performing setting regarding the order from the user;

estimating, when an order for printing processing using first form data is placed by the user through the provided UI screen, a cost for the printing processing according to the order from the user as an estimated value based on the predicted value, by utilizing the registered log data, without calculating in the calculating step, the predicted value of the amount of consumption of the consumable used for printing the first form data selected by the user;

acquiring second form data from an image forming device connected via a network in a case where an ID of the second form data selected by the user through the user interface screen provided by the providing step is not registered as the log data and the second form data has been registered in the image forming device; and transmitting the estimated value to the client terminal, wherein the estimating step estimates the cost for the printing processing according to the order from the user based on a predicted value of the amount of consumption of the consumable used for printing the second form data by utilizing calculating by the calculating step, when the ID of the second form data is not registered as the log data.

* * * * *